United States Patent [19]

O'Lenick

[11] Patent Number: 5,432,217
[45] Date of Patent: Jul. 11, 1995

[54] PROCESS FOR TREATMENT OF VINYL AND RUBBER

[75] Inventor: Anthony J. O'Lenick, Lilburn, Ga.

[73] Assignee: Siltech Inc, Norcross, Ga.

[21] Appl. No.: 287,510

[22] Filed: Aug. 8, 1994

[51] Int. Cl.$^6$ ............................................. C08L 83/06
[52] U.S. Cl. ..................... 524/247; 524/249; 524/369; 524/378; 524/588
[58] Field of Search ................ 524/247, 249, 369, 378, 524/588

[56] References Cited

U.S. PATENT DOCUMENTS

| | | | |
|---|---|---|---|
| 3,956,174 | 5/1976 | Palcher | 252/400 |
| 5,183,845 | 2/1993 | Parkinson et al. | 524/726 |

Primary Examiner—Joseph L. Schofer
Assistant Examiner—Tom Weber

[57] ABSTRACT

A stable composition and process for cleaning, protecting, preserving, and renewing surfaces, especially rubber and other polymers is disclosed. The treatment chemical is formulated to clean, protect, renew and preserve the polymer surface being treated. The inclusion of an alkanolamine selected from the group consisting of mono-ethanolamine, di-ethanolamine, tri-ethanolamine, mono-isopropanolamine, di-isopropanolamine and tri-isopropanolamine which causes provide outstanding detergency to the formulation without adversely affecting the emulsion stability. Each component contributes to the performance of the composition and facilitates the proper deposition of treatment chemical.

10 Claims, No Drawings

PROCESS FOR TREATMENT OF VINYL AND RUBBER

This invention relates to improved polymer treatment compositions for cleaning, preserving, renewing, protecting and enhancing the appearance of rubber, vinyl, and polymer surfaces. This is achieved by incorporation into the treatment emulsion, at least one member of each of class a–d. The classes are; (a) dimethylpolysiloxane, (b) emulsification agents which facilitates the production of a stable emulsion, (c) an alkanolamine selected from the group consisting of mono-ethanolamine, di-ethanolamine, tri-ethanolamine, mono-isopropanolamine, di-isopropanolamine and tri-isopropanolamine which provides outstanding detergency to the formulation without adversely affecting the emulsion stability, and (d) water.

One of the objects of the invention is to provide cleaning properties to a protectant formulation so that in addition to a superior preservation cleaning can be affected without affecting the emulsion stability. Heretofore, any attempt to incorporation detergents into a treatment emulsion used for treating vinyl and plastic resulted in a breaking of the emulsion and a product which did not function. As will become clear, the stability of the emulsion is based, in part on the choice of proper HLB. The HLB (or hydrophilic/liphophyllic balance) needs to be maintained in a narrow range or the silicone oil will split out of the emulsion. Unfortunately, most commonly used detergents have high HLB values and incorporating them into a stable emulsion is not possible. We have unexpectedly discovered that certain alkanolamine compounds will provide outstanding detergency without adversely affecting the emulsion stability. This allows for a truly multi-functional protectant.

While not limited thereto, a major application for the invention lies in protecting and improving the appearance and useful life of rubber parts of automobiles auto tires, rubber sealing strips, and vinyl tops.

Preservatives made according to the invention will not only protect and enhance the appearance of plastics, particularly vinyls and acrylics, but will also clean them.

All percentages specified are % based upon total composition. All temperatures are in degrees centigrade.

DESCRIPTION OF THE ARTS AND PRACTICES

The oldest materials used for the preservation of rubber were based on lamp black and included materials highly corrosive to metal and painted surfaces commonly found on automobiles. These rubber treatment materials were applied like paint to the rubber surfaces. The rubber treated in this manner had an unnatural "painted" appearance. Re-application required removal of old coatings, and were difficult and inefficient. Not only were such materials ineffective in protecting rubber surfaces from deterioration caused by environmental stresses, but they were also quite messy and difficult to use. In addition, the corrosive and toxic ingredients were harmful to the adjacent surfaces and to the user.

It is also known that dimethylpolysiloxane polymers can be applied to the surface of rubber to give a surface protecting and sealing film. One such method of application is direct application of the dimethylpolysiloxane to the polymer surface. While resulting in some surface protection the method of application is cost ineffective and results in a nonuniform greasy film. Another method is to dissolve the dimethylpolysiloxane in a solvent like mineral spirits and apply the solution to the tire. In addition to the environmental liabilities of using a polluting flammable solvent, the solvent often has a deleterious effect upon the rubber. The last and most accepted application method is the preparation of an aqueous emulsion using a surface active agent and high pressure processes like homogenization to get a milky white liquid.

There have been several practical limitations on the use of such an aqueous product. Most of which result from two problems (a) the inability to lay down a uniform film without several applications, and (b) the sealing of the polymer surface. Several inventors have addressed the problems. Most notably, U.S. Pat. No. 3,956,174 issued May 1976, to Palcher discloses that a dimethylpolysiloxane emulsion can be improved by addition of from about 15% to about 65% by weight of one or more polyol compounds, preferably diethylene glycol and glycerin. The patent teaches that the preservative disclosed is compounded of nontoxic materials which are safe for the user as well as for surfaces adjacent to rubber parts on automobiles. The Palcher invention attempts to seal up the tire pores by inclusion of these polyols. This may be cosmetically appealing, but is not the preferred way to treat the polymer surface. Polymers are porous materials through which pass small amounts of water, environmental gases, ozone and other materials. The degradation of the polymer which starts on the surface, also occurs within the porous polymer matrix. While sealing up the porous structures with the Palcher compositions, minimizes surface degradation, little protection is given to the internal polymer structure. Until the compositions of this invention, surface treatments were all that was available.

Palcher states "An object of the invention is to provide a substantial degree of protection and preservation over a substantial period of time. To this end, it has been further discovered that a significantly greater measure of protection can be imparted, especially to natural and synthetic polymer surfaces, if at least one polyol compound is added to the emulsion of the organopolysiloxane and water. Not only is a greater degree of protection and longevity thereof provided by this composition, but also the appearance is greatly improved. These constituents appear not to combine chemically but they do combine mechanically to a homogeneous mixture. Combination is accomplished by emulsifying the silicone in water and then adding the other constituents to that emulsion. The result achieved by treatment with the mixture is different, and better than the result that is achieved if the material is treated with the constituents individually." Clearly, the Palcher patent requires cleaning first and therefore the glycols included in the formulations were not used for cleaning. In practice, multiple applications of a treatment product after cleaning is impractical and rarely done. It was not until the present invention that a truly one step product has been possible. The compositions clean, protect, restore and provide ozone protection to polymer surfaces in one application.

U.S. Pat. No. 5,183,845 issued February 1993 to Parkinson et al, which is incorporated herein by reference, teaches "emulsions of the present invention are applied to the polymer surfaces and by virtue of the composition, once applied, the emulsion will break causing the deposition of a uniform coating of treatment chemical. The treatment chemical is formulated to protect, renew and preserve the polymer surface being treated." It was not until the present invention that a truly one step product has been possible. The compositions clean, protect, restore and provide ozone protection to polymer surfaces in one application.

SUMMARY OF THE INVENTION

The compositions of the current invention are treatment emulsions containing at least one component from the following classes (a) dimethylpolysiloxanes (b) emulsification agents which facilitate the production of a stable emulsion, and most importantly, (c) an alkanolamine selected from the group consisting of mono-ethanolamine, di-ethanolamine, tri-ethanolamine, mono-isopropanolamine, di-isopropanolamine and tri-isopropanolamine which provides outstanding detergency to the formulation without adversely affecting the emulsion stability, and (d) water.

In order to clean, preserve and renew surfaces the treatment composition of the invention are applied to the polymer surface to be treated. One preferred method is spraying. The compounds of this invention can be applied to the polymer surface, wet or dry. Previous compositions were applicable only to wet surfaces. We believe that penetration of the polymer surface by the dimethylpolysiloxane occurs by capillary action whereby the molecules of the preservative composition, and especially the polysiloxane fluid, are drawn into the surface. There, the molecules can hook or wrap around the molecules of the material to be protected to physically attach themselves thereto.

DETAILED DESCRIPTION OF THE INVENTION

It has been found that detergency can be incorporated into protectant compositions by including an alkanolamine selected from the group consisting of mono-ethanolamine, di-ethanolamine, tri-ethanolamine, mono-isopropanolamine, di-isopropanolamine and tri-isopropanolamine which causes provide outstanding detergency to the formulation without adversely affecting the emulsion stability. This allows for a truly multi-functional product.

The emulsion composition comprises;
(a) a dimethylpolysiloxane conforming to the following structure;

$$\text{Me}-\underset{\underset{\text{Me}}{|}}{\overset{\overset{\text{Me}}{|}}{\text{Si}}}-\left[\text{O}-\underset{\underset{\text{Me}}{|}}{\overset{\overset{\text{Me}}{|}}{\text{Si}}}\right]_n-\text{O}-\underset{\underset{\text{Me}}{|}}{\overset{\overset{\text{Me}}{|}}{\text{Si}}}-\text{Me}$$

wherein:
Me is methyl;
n is an integer ranging from 49–1575;
(b) an emulsification agent having an HLB of between 8 and 11;
(c) an alkanolamine selected from the group consisting of mono-ethanolamine, di-ethanolamine, tri-ethanolamine, mono-isopropanolamine, di-isopropanolamine and tri-isopropanolamine;
and (d) water.

In a preferred embodiment the emulsion composition which comprises;

(a) 5–30% of a dimethylpolysiloxane conforming to the following structure;

$$\text{Me}-\underset{\underset{\text{Me}}{|}}{\overset{\overset{\text{Me}}{|}}{\text{Si}}}-\left[\text{O}-\underset{\underset{\text{Me}}{|}}{\overset{\overset{\text{Me}}{|}}{\text{Si}}}\right]_n-\text{O}-\underset{\underset{\text{Me}}{|}}{\overset{\overset{\text{Me}}{|}}{\text{Si}}}-\text{Me}$$

wherein:
Me is methyl;
n is an integer ranging from 49–1575;
(b) 0.5–5.0% of emulsification agent having an HLB of between 8 and 11;
(c) 0.5 and 5.0% of an alkanolamine selected from the group consisting of mono-ethanolamine, di-ethanolamine, tri-ethanolamine, mono-isopropanolamine, di-isopropanolamine and tri-isopropanolamine.
and
(d) 60–94% water.

In a more preferred embodiment the emulsion composition comprises;
(a) 15–30% of a dimethylpolysiloxane conforming to the following structure;

$$\text{Me}-\underset{\underset{\text{Me}}{|}}{\overset{\overset{\text{Me}}{|}}{\text{Si}}}-\left[\text{O}-\underset{\underset{\text{Me}}{|}}{\overset{\overset{\text{Me}}{|}}{\text{Si}}}\right]_n-\text{O}-\underset{\underset{\text{Me}}{|}}{\overset{\overset{\text{Me}}{|}}{\text{Si}}}-\text{Me}$$

wherein:
Me is methyl;
n is an integer ranging from 49–1575;
(b) 1.0–5.0% of emulsification agent having an HLB of between 8 and 11;
(c) 1.0 and 5.0% of an alkanolamine selected from the group consisting of mono-ethanolamine, di-ethanolamine, tri-ethanolamine, mono-isopropanolamine, di-isopropanolamine and tri-isopropanolamine.
and
(d) 60–93% water.

In a preferred embodiment the alkanolamine is di-ethanolamine.

The classes of materials which make up the composition are;
(a) Dimethylpolysiloxane In order to fully define the structure of the dimethylpolysiloxanes, the following information is taken from the Siltech Inc. bulletin on fluids;

Siltech Fluids conform to the following generic structure;

$$\text{Me}-\underset{\underset{\text{Me}}{|}}{\overset{\overset{\text{Me}}{|}}{\text{Si}}}-\left[\text{O}-\underset{\underset{\text{Me}}{|}}{\overset{\overset{\text{Me}}{|}}{\text{Si}}}\right]_n-\text{O}-\underset{\underset{\text{Me}}{|}}{\overset{\overset{\text{Me}}{|}}{\text{Si}}}-\text{Me}$$

wherein
Me is methyl;
n is an integer ranging from 49–1575.

Silicone fluids are sold by their viscosity. The viscosity, expressed in centistokes measured at 25C, defines the value of "n" and consequently the molecular weight.

Siltech Inc. markets the following fluids;

| Regular Viscosity Fluids | | |
|---|---|---|
| Siltech Name | Viscosity 25 C. (Centistokes) | Molecular Weight |
| Siltech F-50 | 50 | 3,780 |
| Siltech F-100 | 100 | 5,970 |
| Siltech F-200 | 200 | 9,430 |
| Siltech F-350 | 350 | 13,650 |
| Siltech F-500 | 500 | 17,250 |
| Siltech F-1,000 | 1,000 | 28,000 |

| High Viscosity Fluids | | |
|---|---|---|
| Siltech Name | Viscosity 25 C. (Centistokes) | Molecular Weight |
| Siltech F-10,000 | 10,000 | 62,700 |
| Siltech F-12,500 | 12,500 | 67,700 |
| Siltech F-60,000 | 60,000 | 116,500 |

Knowing the molecular weight and the structure allows for calculation of "n", which will range from 49 (F-50), to 1575 (F-60,000).

The dimethylpolysiloxane fluid or liquid silicone in the composition functions as lubricant for the polymer molecules and as waterproofing the rubber. Both mechanisms impede scission. Scission is promoted by the presence of ozone and other environmental chemicals. A thin film of silicone applied to the polymer being treated both at the surface and within the matrix is most effective in helping to exclude deleterious materials.

The compositions of the invention contain at least one viscosity dimethylpolysiloxane fluid. In a preferred embodiment there are two different viscosity fluids. These fluids are also referred to as silicone fluids and are distinguished from silicone elastomers and resins. They are basically dimethylpolysiloxane fluids, which are substantially linear in nature.

Dimethylpolysiloxane fluids are available as mixtures of polymers of varying chain length. It has been found for purposes of the invention that the viscosity of the silicone fluids is a measure of the effectiveness. Silicone fluids can be used which have a viscosity range from 50 centistokes up to about 60,000 centistokes.

In a preferred embodiment a mixture of two fluids, one having a low viscosity fluid (Siltech F-50 to Siltech F-100) (50-100 centistokes), and the other a higher viscosity fluid Siltech F 1,000 to Siltech F 60,000 (1,000 to 60,000 centistokes) results in the best performance attributes. We believe that the increased performance obtained by using two different viscosity fluids is based upon penetration. The high viscosity dimethylpolysiloxane has some difficulty penetrating the surface to be protected. It remains on or close to the surface of the polymer being treated and provides a protective surface barrier. It also provides added gloss. The low viscosity dimethylpolysiloxane on the other hand, if prepared in a composition of this invention, rapidly penetrates the surface. This low viscosity fluid acts as a polymeric lubricant in the polymer matrix. It also coats the polymer molecules and provides protection within the matrix.

(b) Emulsification Agent

The emulsification agent facilitates the production of a stable emulsion. In short it allows for the oil soluble dimethylpolysiloxanes and other oils to remain suspended in a milky white emulsion, until they can be applied to the surface of the polymer being protected.

Many types of emulsifiers can be used in the preparation of the compounds of this invention. The materials useful in this application have an HLB of between 8.0 and 11.

HLB is the measure of the amount of water soluble component on an emulsification agent. Typically for a nonionic surfactant it is calculated as HLB=(% water soluble component in the surface active agent)/5

Therefore emulsification agents useful in the practice of this invention will have between 40 and 50% water soluble component present in the compound. Most commonly, a pair of emulsifiers are blended to get an HLB with a numerical average of 8 to 11. Emulsifier pairs generally result in a more stable emulsion.

Examples of various emulsifiers were evaluated to show the affect of HLB the formula tested for this section was;

| Material | | % Weight |
|---|---|---|
| (a) dimethylpolysiloxane | | |
| 1,000 visc | Siltech F 1,000 | 16.0 |
| 100 visc | Siltech F 100 | 9.0 |
| (b) emulsification agent | | |
| Various | (Above) | 3.0 |
| (c) di-ethanolamine | | 5.0 |
| (d) water | | 67.0 |

The specified emulsifier was added and an emulsion prepared. Each example represents a repeat preparation of the formula substituting the specified emulsifier into the formula.

| Example | Material | HLB | Result |
|---|---|---|---|
| 1 | $C_{12}H_{25}$—O—$(CH_2CH_2O)_3H$ | 8 | Stable |
| 2 | $C_{10}H_{22}$—O—$(CH_2CH_2O)_3H$ | 9 | Stable |
| 3 | $C_{10}H_{22}$—O—$(CH_2CH_2O)_6H$ | 12.5 | Split (Unstable) |
| 4 | Nonylphenol with 5 moles of E.O. | 10.0 | Stable |
| 5 | Nonylphenol with 6 moles of E.O. | 11.0 | Stable |

This evaluation shows that the HLB is a key to making the emulsion stable. The range from 8 to 11 is critical.

Despite the stability, the products so prepared failed to provide any detergency. Tests were re-run evaluating various additives aimed at providing the desired detergency. Tires soiled with mud were tested with modifications of the above formulations.

(C) Alkanolamine

Alkanolamines are items of commerce and confirm to the following structure;

| Alkanolamine | Structure |
|---|---|
| mono-ethanolamine | $H_2N$—$CH_2CH_2$—OH |
| di-ethanolamine | HN—$(CH_2CH_2$—OH$)_2$ |
| tri-ethanolamine | N—$(CH_2CH_2$—OH$)_3$ |
| mono-isopropanolamine | $H_2N$—$CH_2CH(CH_3)$—OH |
| di-isopropanolamine | HN—$(CH_2CH(CH_3)$—OH$)_2$ |
| tri-isopropanolamine | N—$(CH_2CH(CH_3)$—OH$)_3$ |

In order to evaluate the detergency affects, the alkanolamine compounds of the present invention were added at 5% solids to the specified emulsion. The stability and detergency were then evaluated. Detergency was evaluated on a scale of 1-5 (1 worst (no detergency) to 5 best).

EXAMPLE 6

| Material | | % Weight |
|---|---|---|
| (a) dimethylpolysiloxane | | |
| 1,000 visc | Siltech F 1,000 | 16.0 |
| 350 visc | Siltech F 350 | 9.0 |
| (b) Emulsifier | | 3.0 |
| (Example 2) | | |
| (c) Di-ethanolamine | | 3.0 |
| (d) water | | 69.0 |

The above formula was found to be stable and have exceptional detergency.

EXAMPLES 7-14

Example 6 was repeated only this time the specified alkanolamine was substituted for the di-ethanolamine;

| Example | Additive @ 5% Weight | Emulsion Stability | Detergency |
|---|---|---|---|
| 7 | mono-ethanolamine | Stable | 5 |
| 8 | tri-ethanolamine | Stable | 4 |
| 9 | mono-isopropanolamine | Stable | 3 |
| 10 | di-isopropanolamine | Stable | 5 |
| 11 | tri-isopropanolamine | Stable | 4 |
| 12 | Sodium Dodecyl Benzene Sulfonic Acid | Split | * |
| 13 | Sodium Lauryl Sulfate | Split | * |
| 14 | Alpha olefin Sulfonate | Split | * |

*products which were split could not be evaluated for detergency.

EXAMPLE 15

| Material | | % Weight |
|---|---|---|
| (i) dimethylpolysiloxane | | |
| 1,000 visc | Siltech F 1,000 | 16.0 |
| 350 visc | Siltech F 350 | 9.0 |
| (ii) Emulsifier | | 3.0 |
| (Example 4) | | |
| (iii) Di-ethanolamine | | 3.0 |
| (iii) water | | 69.0 |

The above formula was found to be stable and have exceptional detergency.

EXAMPLES 16-23

Example 15 was repeated only this time the specified alkanolamine was substituted for the di-ethanolamine;

| Example | Additive @ 5% Weight | Emulsion Stability | Detergency |
|---|---|---|---|
| 16 | mono-ethanolamine | Stable | 4 |
| 17 | tri-ethanolamine | Stable | 4 |
| 18 | mono-isopropanolamine | Stable | 3 |
| 19 | di-isopropanolamine | Stable | 5 |
| 20 | tri-isopropanolamine | Stable | 5 |
| 21 | Sodium Dodecyl Benzene Sulfonic Acid | Split | * |
| 22 | Sodium Lauryl Sulfate | Split | * |
| 23 | Alpha olefin Sulfonate | Split | * |

*products which were split could not be evaluated for detergency.

As is clearly seen, the alkanolamine selected from the group consisting of mono-ethanolamine, di-ethanolamine, tri-ethanolamine, mono-isopropanolamine, di-isopropanolamine and tri-isopropanolamine provides outstanding detergency to the formulation without adversely affecting the emulsion stability. The alkanolamines, while not normally considered detergents by themselves, unexpectedly function as detergents in our emulsion systems.

The more commonly used detergents all destroy the emulsion by altering the HLB of the system. They cannot be used in producing commercially viable compositions. The use of alkanolamines (a) provides detergency; (b) has no affect upon HLB; (c) has no affect upon emulsion stability; and (d) provides a commercially viable system for a multi-purpose treatment product.

What is claimed:

1. A process for treating polymer surfaces which comprises contacting the polymer surface with an effective treating amount of an emulsion composition which comprises;

(a) a dimethylpolysiloxane conforming to the following structure;

$$Me-\underset{\underset{Me}{|}}{\overset{\overset{Me}{|}}{Si}}-\left[O-\underset{\underset{Me}{|}}{\overset{\overset{Me}{|}}{Si}}\right]-\left[O-\underset{\underset{Me}{|}}{\overset{\overset{Me}{|}}{Si}}-Me\right]_n$$

wherein:
Me is methyl;
n is an integer ranging from 49-1575;
(b) an emulsification agent having an HLB below 11;
(c) an alkanolamine selected from the group consisting of mono-ethanolamine, di-ethanolamine, tri-ethanolamine, mono-isopropanolamine, di-isopropanolamine and tri-isopropanolamine; and
(d) water.

2. A process of claim 1 wherein said alkanolamine is mono-ethanolamine.

3. A process of claim 1 wherein said alkanolamine is di-ethanolamine.

4. A process of claim 1 wherein said alkanolamine is tri-ethanolamine,

5. A process of claim 1 wherein said alkanolamine is mono-isopropanolamine,

6. A process of claim 1 wherein said alkanolamine is di-isopropanolamine,

7. A process of claim 1 wherein said alkanolamine is tri-isopropanolamine.

8. A process of claim 1 which comprises:
(a) 5-30% by weight of total composition of the dimethylpolysiloxane;
(b) 0.5-5.0% by weight of total composition of the emulsification agent;
(c) 0.5 and 5.0% by weight of total composition of the alkanolamine and 60-94% by of total composition weight of water.

9. A process of claim 1 wherein said polymer is vinyl.

10. A process of claim 1 wherein said polymer is rubber.

* * * * *